United States Patent Office 3,725,153
Patented Apr. 3, 1973

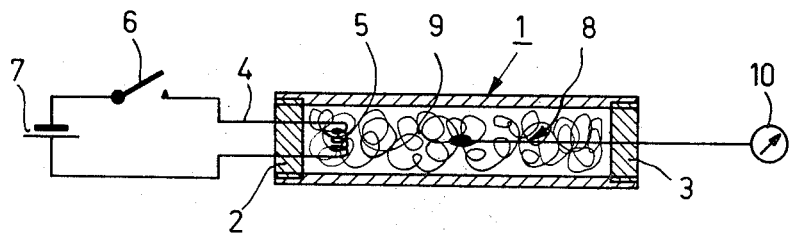
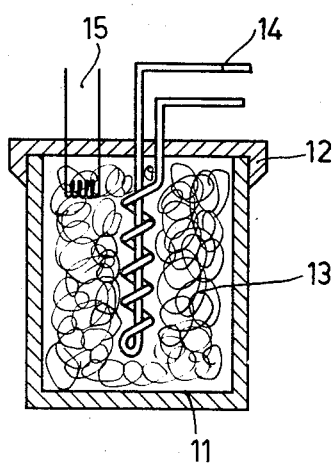

3,725,153
MASS WHICH AFTER IGNITION SUPPLIES HEAT FOR SOME TIME AS A RESULT OF A REACTION AMONG SEVERAL CONSTITUENTS OF THE MASS
Johann Schröder, Aachen, Germany, and Roland Anton Johan Otto van Witteveen, Eindhoven, Netherlands, assignors to U.S. Philips Corporation, New York, N.Y.
Filed Aug. 27, 1971, Ser. No. 175,466
Claims priority, application Netherlands, Aug. 29, 1970, 7012828
Int. Cl. C06b 15/00, 21/02; F24i 1/04
U.S. Cl. 149—19       4 Claims

ABSTRACT OF THE DISCLOSURE

A mass was found which can supply heat for some time after ignition. The mass consists of materials which mutually react chemically while developing heat, such as lithium and a halogen compound and one or more fluorides which serve for temporarily storing the developed heat, for example, in the form of melting heat.

---

In various technical sectors there is a need for a source of calorific energy which is able to supply calorific energy and operates independent of the outside atmosphere at comparatively high temperatures, for example, temperatures of between approximately 600 to and 1300° C.

There are various methods of solving this problem.

U.S. patent specification No. 3,080,706 described a hot gas engine which operates in accordance with the Stirling principle and whose heater pipes are present in a heat accumulator which is filled with a material having a melting point of more than approximately 425° C. and a heat of fusion of at least approximately 167 Kcal./kg. A suitable material is lithium fluoride (melting point 848° C., melting heat approximately 267 Kcal./kg.). As compared with the other lithium compounds mentioned in this patent specification this material has the highest heat of fusion per unit volume.

A heat accumulator as described in this patent specification has various drawbacks.

It is impossible to store the accumulator in a "loaded" condition over a comparatively long period. The heat accumulator must be loaded by the supply of energy from the exterior, for example, by means of a heat source: this is time-consuming.

A further solution to the mentioned problem is a system in which an oxidizable material and an oxidant are reacted in a chemical reactor. The advantage of such a system is that the reactor, if ready for use, is able to supply heat at a fast rate and can operate over a controllable period. However, this system has drawbacks too. It must be possible to supply one or both reaction components, which may be mixed, to the reactor in a controllable manner. Products of the reaction between the oxidizable material and the oxidant must not deposit on the heat exchangers present in the reactor space. All this requires, inter alia, controlling mechanisms and pumps so as to control the heat-producing reaction in such a manner that the heat is released at a constant temperature and to the desired extent.

U.S. patent specification No. 3,156,595 describes a liquid mass composition which when poured out on a heated surface is able to supply calorific energy as a result of a reaction among the constituents of the mass. The liquid masses described for this purpose in this patent specification comprise a dispersion of a mixture of finely divided aluminum and lithium in a liquid polymer which has the empirical formula $(CF_2CFCl)_n$.

It is true that the patent specification No. 3,156,595 refers to the possibility of use in closed systems but the specification does not give any indication with regard to the outlay of such a system and the components thereof, such as the reactor, control systems and pumps for the transport of the liquid mass to the reactor and the removal of reaction products.

This patent specification does not offer a solution for the difficulties met in using such systems. These difficulties are particularly felt when the system is built in devices intended to be used only once. However, also in devices which are used several times over a constant, relatively short period, it would be attractive to have an uncomplicaed heat-supplying system available.

An object of the present invention is to provide a mass which may be used in a heat-supplying system, particularly a system to be used once, without the drawbacks of the described systems occurring.

A mass according to the invention, capable of satisfying these requirements is characterized in that the mass comprises an intimate mixture of:

(a) one or more fluorides chosen from the group consisting of lithium fluoride, potassium fluoride, sodium fluoride, magnesium fluoride and calcium fluoride, and a quantity of
(b) lithium and
(c) a quantity which is at most stoichiometrical relative to the quantity of lithium with regard to the halogen content of a carbon compound, which at 20° C. is solid or highly viscous, whose valencies of the carbon atom not used up in carbon-to-carbon bonds are saturated with fluorine or are saturated partly with fluorine and partly with chlorine, such that the mass reaches a temperature of at least approximately 600° C. after ignition.

It was found that at a temperature of approximately 600° C. or more the reaction proceeds quickly and takes place in the entire mass. If the ratio between LiF and Li in the mass is chosen to be such that the temperature during the reaction cannot increase to approximately 600° C., the reaction does not proceed quickly enough and is incomplete. Only when such a quantity of lithium is present that temperatures of 600° C. or more are reached does the reaction in the entire mass proceed within several seconds.

Based on data known from literature, it can be calculated in a simple manner which mass compositions satisfy the criterion of the mass reaching a temperature of at least 600° C. after ignition.

The mass may be ignited in a simple manner, for example, by heating it locally up to a temperature of approximately 400° C. or higher which may be effected for example, electrically.

After ignition the mass reaches the desired temperature level within several seconds. A satisfactory transfer of heat and a quick reaction process is obtained when the temperature during the reaction exceeds the melting point of the halides being formed and present in the mass. According to a preferred embodiment of the invention the mass contains a quantity of lithium and a quantity which is at most stoichiometrical relative to the quantity of lithium calculated on the halogen content of a carbon compound which is solid at 20° C. or which is highly viscous, and whose valencies of the carbon atoms not used up in carbon-to-carbon bonds are saturated with fluorine or partly with fluorine and partly with chlorine, such that after termination of the reaction among these components the reaction mixture reaches at least a temperature at which the halogen compounds present therein have melted.

A further advantage of this embodiment is that the energy stored in the form of melting heat in the mass can be taken up at a constant temperature. The melting temperatures of the said fluorides and those of some eutectics formed by two or more fluorides are, for example, for LiF: 848° C.; $MgF_2$: 1263° C.; $CaF_2$: 1418° C.; KF: 857° C.; NaF: 1012° C.; 78 mol percent LiF plus 22 mol percent $CaF_2$: 775°C.; 67 mol percent LiF plus 33 mol percent $MgF_2$: 710° C.; 65 mol percent NaF plus 35 mol percent $CaF_2$: 810° C.; 52 mol percent LiF plus 35 mol percent NaF plus 13 mol percent $CaF_2$: 615° C.

Calculated on lithium fluoride, the amount of heat which can be taken up per litre at the melting temperature is 445 kcal. In addition the capacitively bound heat can be taken up. This is, for example, for lithium fluoride in case of cooling from the melting point (848° C.) to 450° C.: 380 kcal. per litre and upon cooling to 50° C.: 520 kcal. per litre.

During the reaction between lithium and a fluorocarbon compound or a fluorochlorocarbon compound free carbon is formed in addition to lithium fluoride and optionally lithium chloride, in which only a slight part of said free carbon is soluble in the molten halogenides. This free carbon may be troublesome under certain circumstances. However, it has been found that if magnesium and/or calcium are present in the mass, carbides are formed during the reaction. These carbides are found to be soluble in the molten halides, so that when using mixtures of lithium with magnesium and/or calcium homogeneous melts may be obtained. As a result a satisfactory transfer of heat is assured. The mass according to the invention therefore preferably comprises magnesium and/or calcium in addition to lithium. The mixture of lithium with magnesium and/or calcium may be used in the form of alloys.

The masses according to the invention are prepared as follows. A powder of a metal chosen from the group consisting of lithium, mixtures of lithium with magnesium and of lithium with calcium is mixed with a fluorocarbon and/or a fluorochlorocarbon compound. Subsequently this mixture is mixed with one or more fluorides chosen from the group consisting of lithium fluoride, sodium fluoride, magnesium fluoride and calcium fluoride.

In principle any aliphatic and aromatic carbon compound whose valences of the carbon atoms not used up in carbon-to-carbon bonds are saturated with fluorine may be used as the carbon compound in the masses according to the invention. In some cases it may be desirable for technological reasons that a plurality of chlorine atoms is also present in the compound. This may be the case, for example, when the mixture of metal and fluorocarbon compound is prepared while using a solvent and when the compound entirely consisting of fluorine and carbon is insoluble or less soluble than an analogous compound in which aptr of the fluorine atom is replaced by chlorine. The fluoro-carbon compounds to be used must not contain hydrogen and nitrogen and comprise preferably not more than 10 atom percent of sulphur and/or of oxygen. Suitable materials are, for example, non-volatile products which may be obtained when replacing the hydrogen in some hydrocarbon compounds by fluorine. The products may comprise up to 20 atom percent of chlorine. Also polytetrafluoroethylene might be suitable for said purpose.

However, such fluorocarbon or fluorochlorocarbon compounds are preferably used which have a wax-like or fatty consistency at room temperature. When using such compounds it is possible to provide each metal particle with a thin film of the compound. In addition to an intimate mixture, a better mouldability of the mixture is obtained in this manner. Moreover, in case of storage and transport demixing cannot occur which is, for example, possible with mixtures of powders. In this connection poly(monochlorotrifluoroethylene) having a mean molecular weight of between approximately 900 and 10,000 has been found to be very suitable.

According to a preferred embodiment of the method of preparing the masses according to the invention, the fluorocarbon compound or the fluorochlorocarbon compound is dissolved in a dispersion of lithium or a lithium alloy in a suitable solvent.

The solvent may consist of, for example, a liquid hydrocarbon such as hexene, heptane, benzene, xylene. The solution may comprise, for example, between 5 and 50% by weight of the macromolecular material. While steadily stirring at temperature of between 20 and 60° C. the solvent is removed under a vacuum. The ultimate mass can satisfactorily be moulded. In case of ignition a reaction occurs, in which as a function of the quantity of poly(monochlorotrifluoroethylene) present which may be from 5 to 30% by weight calculated on the mixture, temperatures of between approximately 200° C. and 1000° C. are reached within several seconds. The dispersion obtained is mixed with the desired quantity of fluoride and optionally magnesium or calcium. Subsequently the solvent is driven off. The remaining mass is brought to the desired shape, for example, by means of moulding.

When moulding the metal fluorocarbon compound mixture into the desired shape, not all pores will disappear from the mixture and it is often desired to have a given pore volume available in order to compensate for the thermal expansion of the mass. To prevent high gas pressures from occurring during the reaction, it is therefore preferred to give the mixture if desired a shape in an atmosphere which consists of a gas or a mixture of gases which react only at temperatures of more than approximately 100° C. with the metal mixture also present in the mass while forming non-volatile products at the reaction temperature. Gases suitable for this purpose are $SF_6$ and volatile fluorocarbon and fluorochlorocarbon compounds such as $CF_4$, $C_2F_6$, $CClF_3$ and the like.

By controlling the pore volume it may be achieved that the volume of the mass after melting is not larger than the initial volume of the mass in the solid state.

The lithium-magnesium and lithium-calcium mixtures may be used in the form of alloys. These alloys are generally brittle and are therefore easier to pulverize than the pure metals.

The invention will further be described with reference to the following examples.

EXAMPLE I

A mass A was prepared which consisted of:

| | G. |
|---|---|
| Lithium fluoride | 67.1 |
| Lithium | 5.0 |
| Calcium | 7.2 |
| Polymonochlorotrifluoroethylene (molecular weight approximately 1000) | 20.7 |

The desired quantity of lithium was dispersed in 0.2 litre of hexane (grain size approximately 0.2 micrometre). The polymonochlorotrifluoroethylene was then dissolved in the dispersion: subsequently lithium fluoride and calcium were added in a pulverulent form to the dispersion. The grain size of these two materials may vary. In this case powders having grain sizes of less than 20 micrometres were used.

The suspension was evaporated to dryness, while stirring and heating at 50° C. at a pressure of 400 torr. A fine white powder, which may be exposed to the atmosphere was the result.

EXAMPLE II

In the manner as described in Example I a mass B was prepared, consisting of:

| | G. |
|---|---|
| Lithium fluoride | 65.6 |
| Lithium | 5.2 |
| Calcium | 7.5 |
| Polymonochlorotrifluoroethylene (molecular weight approximately 1000) | 21.7 |

EXAMPLE III

A mass C was prepared consisting of:

| | G. |
|---|---|
| Lithium fluoride | 67.1 |
| Lithium-calcium alloy (41% by weight of Li plus 59% by weight of Ca) | 12.2 |
| Polymonochlorotrifluoroethylene (molecular weight approximately 1000) | 20.7 | in the manner as described in Example I.

EXAMPLE IV

A mass D was prepared consisting of:

| | G. |
|---|---|
| Lithium | 7.5 |
| Polymonochlorotrifluoroethylene (molecular weight approximately 1000) | 20.8 |
| Lithium fluoride | 71.7 | in the manner as described in Example I.

In mass L 71.7 g. of lithium fluoride may be replaced by 95.6 g. of a eutectic mixture of 75 mol percent NaF and 25 mol percent $MgF_2$ or by 106.8 g. of a eutectic mixture of 65 mol percent NaF, 23 mol percent $CaF_2$ and 12 mol percent $MgF_2$.

The masses A, B, C and D were tested in a device as is shown diagrammatically in FIG. 1 of the accompanying drawing. In the drawing FIG. 2 diagrammatically shows a device in which the masses according to the invention can be used.

A steel tube having a wall thickness of 0.3 mm., outer diameter 25 mms., length 250 mms. was filled with the mass to be examined. The tube 1 may be closed at both ends by means of threaded plugs 2 and 3. Plug 2 supports an ignition device 4 consisting of a filament 5 which can be connected across the switch 6 to a current source 7.

Plug 3 supports a thermal element 8 with which the temperature of the mass 9 in the tube is measured. The thermal element is connected to a device shown diagrammatically and indicating the temperature.

The temperatures given in the table below were reached with the masses A, B, C and D according to the Examples I to IV. The table also indicated observations performed on the reaction products.

TABLE

| Mass: | Temp. in °C. | Reaction product |
|---|---|---|
| A | 850 | Entirely molten, no free carbon. |
| B | 860 | Do. |
| C | 850 | Do. |
| D | 910 | Free carbon present. |

FIG. 2 shows a device consisting of a vessel 11 which is closed by a cover 12. The vessel contains a mass 13 according to the invention. Furthermore a heat exchanger 14 through which a liquid can be pumped and an electrical ignition device 15 are present.

After ignition, the contents of the vessel are at the desired temperature within several seconds and heat can be taken up by means of the heat exchanger for a comparatively long period. It is alternatively possible to provide the heat exchanger on the wall of the vessel.

The masses according to the invention have the following advantages:

(1) The masses may be used in closed systems operating independently of the outside atmosphere and during the reaction volatile constituents are not released. Moulds and fillings may be made from the masses whose volume does not change during the reaction and during melting of the mass.

(2) A large quantity of energy is available per unit volume (approximately 30 times that of a lead accumulator).

(3) The masses may be handled without danger and can be stored for an unlimited period.

(4) The masses may be ignited with simple means (electrically or pyrolytically) at any desired instant and the desired temperature is reached within several seconds.

(5) The greater part of the calorific energy may be taken up at a constant temperature (melting point or eutectic melting temperature).

What is claimed is:

1. A composition suitable for supplying calorific energy in a closed container as a result of ignition of components of the composition and capable of producing only liquid or solid ignition products, said composition consisting of a mixture of at least one fluoride selected from the group consisting of lithium fluoride, sodium fluoride, magnesium fluoride and calcium fluoride, at least one metal selected from the group consisting of lithium, mixtures of lithium and magnesium and mixtures of lithium and calcium, and a halogenated carbon compound containing in addition to carbon only halogen, said halogen being selected from the group consisting of fluorine and mixtures of fluorine and chlorine, said halogenated carbon compound being solid or highly viscous at 20° C., said halogenated carbon compound being present in an amount which is at least stoichiometrically relative to the quantity of lithium present based on the amount of halogen in said halogenated carbon compound.

2. The composition of claim 1 wherein the proportions of the ingredients are such that upon ignition a chemical reaction is produced developing sufficient heat to cause the composition to be in the molten state after the termination of the reaction.

3. A method of manufacturing a moulded article from the composition of claim 1 comprising molding said composition to a desired shape in the presence of a gas which reacts only at temperatures above about 100° C. with the metal present in the composition while forming product that are not volatile at the reaction temperature, thereby producing said article containing said gas in pores of said composition.

4. A porous moulded composition formed of the composition of claim 1, the pores of said moulded compositin being filled with a gas capable of reacting only at temperatures above 100° C. with the metal present in the composition while forming products which do not volatilize at the room temperature.

References Cited

UNITED STATES PATENTS

| 3,156,595 | 11/1964 | Camp et al. | 149—87 |
| 3,441,455 | 4/1969 | Woods et al. | 149—87 X |
| 3,152,935 | 10/1964 | Cadwallader | 149—19 |
| 3,235,422 | 2/1966 | Stang | 149—19 |
| 3,619,306 | 11/1971 | Berthmann et al. | 264—3 R |

CARL D. QUARFORTH, Primary Examiner

E. A. MILLER, Assistant Examiner

U.S. Cl. X.R.

126—263; 149—87; 264—3 R

PO-1050
(5/69)

UNITED STATES PATENT OFFICE
CERTIFICATE OF CORRECTION

Patent No. 3,725,153          Dated  April 3, 1973

Inventor(s)  JOHANN SCHRODER ET AL

It is certified that error appears in the above-identified patent and that said Letters Patent are hereby corrected as shown below:

Column 6, line 44, "product" should be -- products --.

Signed and sealed this 9th day of April 1974.

(SEAL)
Attest:

EDWARD M.FLETCHER,JR.                C. MARSHALL DANN
Attesting Officer                    Commissioner of Patents